J. W. FULPER.
VACUUM CLEANER.
APPLICATION FILED DEC. 11, 1913.

1,106,329.

Patented Aug. 4, 1914.
2 SHEETS—SHEET 1.

Witnesses
W. C. Fielding
Henry T. Bright

Inventor
J. W. Fulper,
By Chandler & Chandler
Attorneys

J. W. FULPER.
VACUUM CLEANER.
APPLICATION FILED DEC. 11, 1913.
1,106,329.
Patented Aug. 4, 1914.
2 SHEETS—SHEET 2.
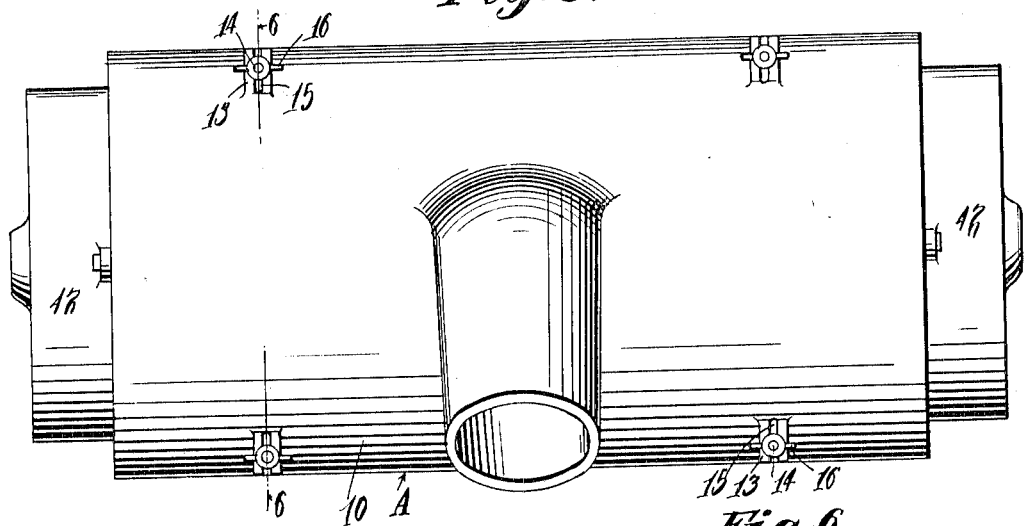
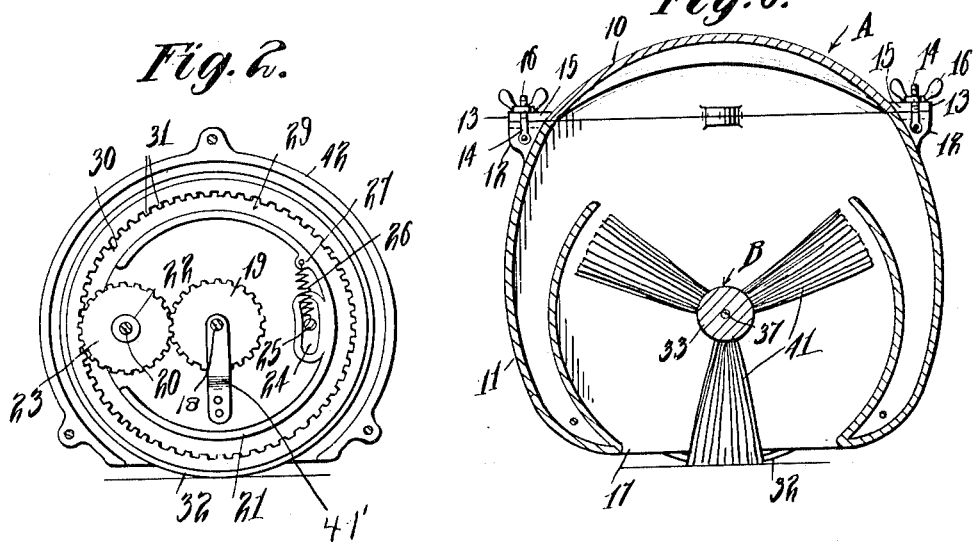
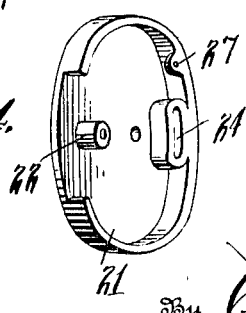
Witnesses
W. C. Fielding
Henry T. Bright
Inventor
J. W. Fulper,
By Chandler & Chandler
Attorneys

UNITED STATES PATENT OFFICE.

JOHN W. FULPER, OF ANNANDALE, NEW JERSEY.

VACUUM-CLEANER.

1,106,329.  Specification of Letters Patent.  Patented Aug. 4, 1914.

Application filed December 11, 1913. Serial No. 806,023.

*To all whom it may concern:*

Be it known that I, JOHN W. FULPER, a citizen of the United States, residing at Annandale, in the county of Hunterdon, State of New Jersey, have invented certain new and useful Improvements in Vacuum-Cleaners; and I do hereby declare the following to be a full, clear, and exact description of the invention, such as will enable others skilled in the art to which it appertains to make and use the same.

This invention relates to vacuum cleaners and particularly to an improved construction of suction nozzle.

The object of the invention resides in the provision of a suction nozzle which has incorporated therein a rotatable brush operated by the movement of the nozzle over the material being cleaned.

A further object of the invention resides in the provision of a suction nozzle including a rotatable brush and rotatable wheels, the latter being yieldingly held in engagement with the material being cleaned and operatively connected with the brush to effect the rotation of the latter.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1:
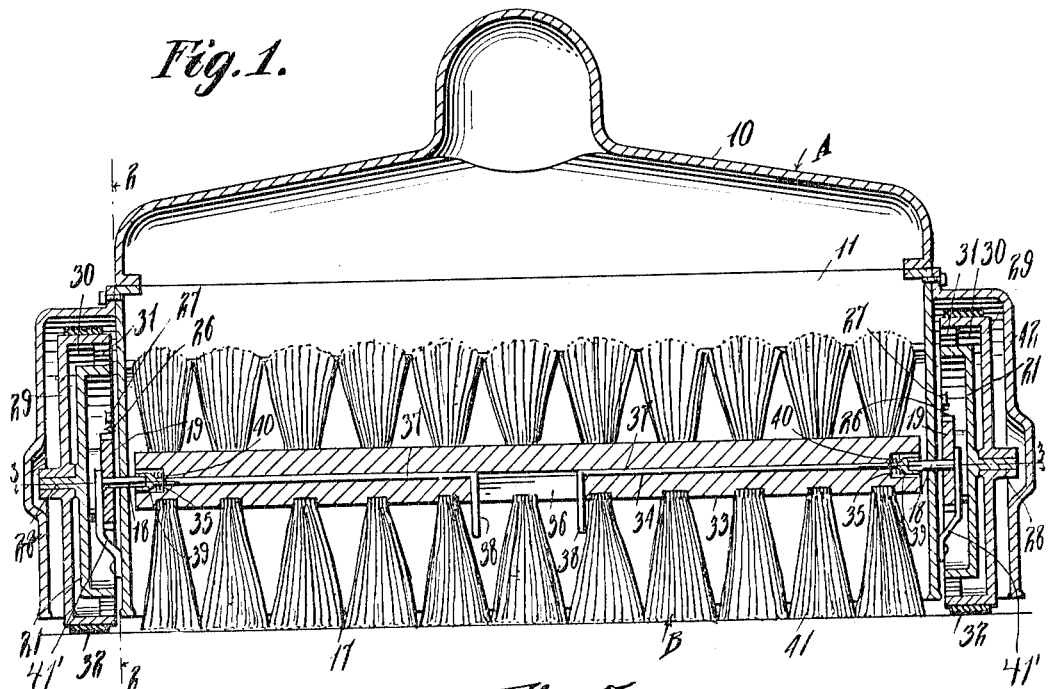
Figure 3:
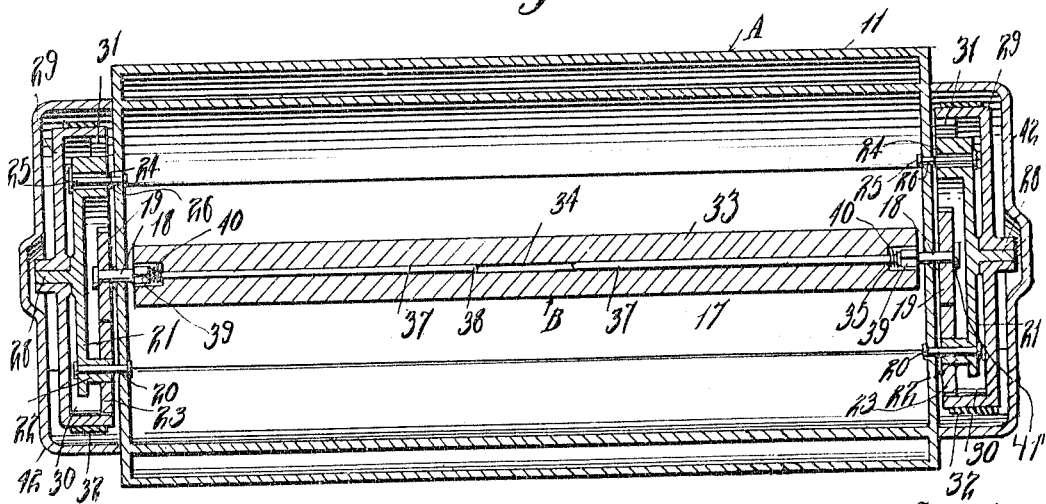

Figure 1 is a vertical section taken through the improved nozzle; Fig. 2, a section on the line 2—2 of Fig. 1; Fig. 3, a section on the line 3—3 of Fig. 1; Fig. 4, a detail perspective view of one of the disks which rotatably support the traction wheels of the nozzle; Fig. 5, a plan view of the nozzle, and Fig. 6, a section on the line 6—6 of Fig. 5.

Referring to the drawings the improved nozzle is shown as comprising a casing A including an upper section 10 and a lower section 11. The lower section 11 is provided at its upper end with lateral flanges 12, upon which rest lateral flanges 13 formed on the upper section 10. Pivoted to the flanges 12 are threaded members 14 which are adapted to be swung into recesses 15 formed in the flanges 13. When the threaded members 14 are engaged in the recesses 15 winged nuts 16 are applied to the threaded members and screwed home. In this manner the sections 10 and 11 of the casing A are detachably secured together. The lower section 11 is provided with a mouth 17 as is customary in devices of this character. Rotatably mounted in each end of the casing A is a stub shaft 18 the inner end of which is squared, while the outer end thereof has fixed thereon a pinion 19. Secured to each end of the casing A is a pin 20 upon which is rotatably mounted a disk 21 having a hub extension 22 surrounding the pin 20. Rotatably mounted on this hub extension 22 is a pinion 23 which meshes with the pinion 19. The disk 21 is further provided with a slot 24 arranged concentric to the hub portion 22 and extending through this slot 24 is a pin 25 carried by the adjacent end of the casing A. Connected to the pin 25 is one end of a spring 26 and the other end of this spring is connected to an extension 27 on the disk 21. Each of the disks 21 is provided with a central lateral extension 28 disposed oppositely to the hub 22. Journaled on the extension 28 is a traction wheel 29 provided with an inwardly directed peripheral flange 30 the outer face of which is adapted to bear upon the material being cleaned, while the inner face thereof is provided with gear teeth 31 which mesh with the pinion 23. The outer face of the flange 30 has mounted thereon a rubber bearing face 32.

The brush element of the nozzle is indicated generally at B and is shown as comprising a core 33 provided with a longitudinal bore 34 enlarged at each end to form a shoulder 35. The core 33 is further provided with a transverse passage 36 which communicates at its inner end with the bore 34. Slidable in the bore 34 are rods 37 the inner ends of which are directed laterally at 38 and project beyond the outer face of the core 33. The outer ends of the rods 37 terminate in sockets 39 and encircling each rod 37 between the socket 39 and shoulder 35 is a spring 40. These springs 40 constantly tend to move the rods 37 outwardly and maintain the sockets 39 in interlocking relation with the inner ends of the stub shaft 18 whereby the rotation of said stub shaft will produce a corresponding rotation of the hub 33 which latter is provided with the usual radially disposed brush bristles 41.

From the foregoing construction it will be apparent that the springs 26 will swing the traction wheels 30 and disks 21 on respective pins 20 to dispose the peripheries of the traction wheels normally outside of the material engaging edges of the casing A. However when the nozzle is applied in operative relation to the material to be cleaned the springs 26 will yield and the traction wheels 30 will swing inwardly of the casing to permit the latter to properly engage the material to be cleaned. Movement of the nozzle over the material will then rotate the traction wheels 30 and this rotation will be transmitted to the brush B through the medium of the connections previously described.

It will be noted that the traction wheels 30 are covered and shielded by means of plates 42 whereby engagement of the operating parts during the use of the nozzle with furniture and the like is obviated.

It will be noted that the outer ends of the stub shafts 18 are journaled in brackets 41' carried by the ends of the casing A.

What is claimed is:—

1. In a device of the character described, the combination of a casing, a brush rotatably mounted in the casing, traction wheels mounted on said casing for bodily swinging movement and disposed at the ends of the brush respectively and in line therewith, spring means constantly tending to hold the traction wheels at the limit of their swinging movement in one direction, and connections between one of said traction wheels and the brush whereby the rotation of said traction wheel will rotate the brush.

2. In a device of the character described, the combination of a casing, a brush rotatably mounted in the casing, a pinion rotatably mounted on the casing, connections between the pinion on the casing and the brush whereby the rotation of the pinion will rotate the brush, a disk mounted on the casing for bodily swinging movement, a pinion rotatably mounted on the disk and meshing with the pinion mounted on the casing, spring means constantly tending to hold the disk at the limit of its swinging movement in one direction, and a traction wheel rotatably mounted on the disk and operatively connected with the pinion carried by the disk whereby the rotation of the traction wheels will effect the rotation of the last named pinion.

In testimony whereof, I affix my signature, in the presence of two witnesses.

JOHN W. FULPER.

Witnesses:
M. D. FULPER,
J. W. SWEAZY.

Copies of this patent may be obtained for five cents each, by addressing the "Commissioner of Patents, Washington, D. C."